United States Patent [19]

Yocom et al.

[11] B 3,981,819

[45] Sept. 21, 1976

[54] LUMINESCENT SULFIDES OF MONOVALENT AND TRIVALENT CATIONS

[75] Inventors: Perry Niel Yocom, Princeton; John Pickett Dismukes, South Branch, both of N.J.

[73] Assignee: RCA Corporation, New York, N.Y.

[22] Filed: Dec. 23, 1974

[21] Appl. No.: 535,813

[44] Published under the second Trial Voluntary Protest Program on January 27, 1976 as document No. B 535,813.

[52] U.S. Cl. .................. 252/301.4 S; 252/301.4 F
[51] Int. Cl.² ........................................ C09K 11/08
[58] Field of Search .............. 252/301.4 S; 423/511

[56] References Cited
UNITED STATES PATENTS

| 3,418,216 | 12/1968 | Royce | 252/301.4 |
| 3,801,702 | 4/1974 | Donohue | 252/301.4 |
| 3,850,837 | 11/1974 | Nath | 252/301.4 |

OTHER PUBLICATIONS
Chandron, M. G.; C. R. Acad. Sc. Paris; t273 Serie C; Oct. 11, 1971, pp. 849–851.

*Primary Examiner*—L. Dewayne Rutledge
*Assistant Examiner*—Michael L. Lewis
*Attorney, Agent, or Firm*—G. H. Bruestle; L. Greenspan

[57] ABSTRACT

A family of luminescent materials or phosphors having a rhombohedral crystal structure and consisting essentially of a mixed host sulfide of at least one monovalent host cation and at least one trivalent host cation, and containing, for each mole of phosphor, 0.0005 to 0.05 mole of at least one activating cation. The monovalent host cations may be Na, K or Rb and Cs. The trivalent host cations may be Gd, La, Lu, Sc and Y. The activating cations may be one or more of trivalent As, Bi, Ce, Dy, Er, Pr, Sb, Sm, Tb and Tm; divalent Eu, Mn, Pb and Sn; and monovalent Ag, Cu, and Tl. The novel phosphors may be used in devices to convert electron-beam, ultraviolet or x-ray energy to light in the visible spectrum. Such energy conversion can be employed for example in fluoroscopic screens, and in viewing screens of cathode-ray tubes and other electron tubes.

7 Claims, 1 Drawing Figure

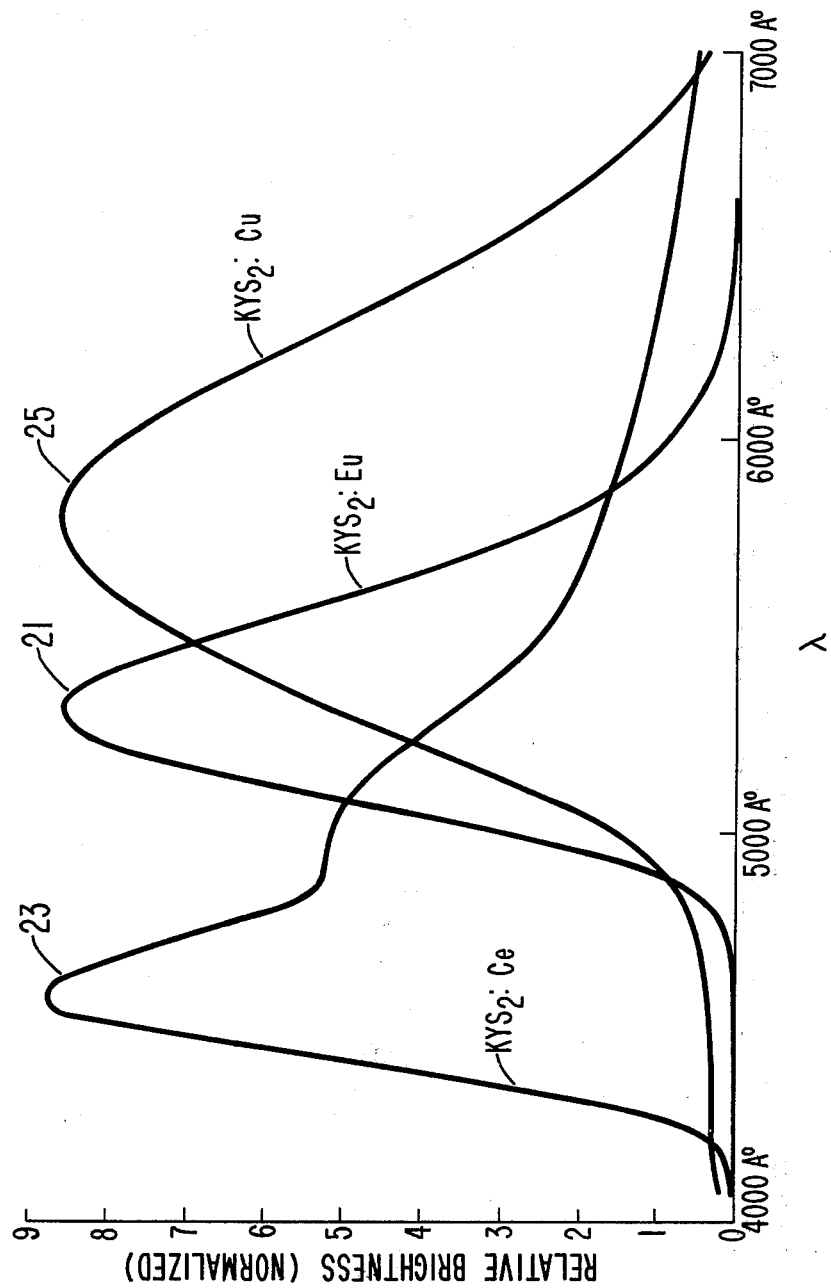

LUMINESCENT SULFIDES OF MONOVALENT AND TRIVALENT CATIONS

BACKGROUND AND SUMMARY OF THE INVENTION

This invention relates to a new family of luminescent materials or phosphors that are photoluminescent, cathodoluminescent and, in some cases, roentgenoluminescent.

Luminescent mixed sulfides of different host cations are known in the art. U.S. Pat. No. 3,174,939 to L. Suchow, for example, discloses mixed sulfides of divalent cadmium and trivalent indium activated with Dy, Ho, Er, Tm, Yb and Lu. These prior phosphors are disclosed to have a spinel crystal structure and to emit infrared radiation when excited with ultraviolet light from a xenon lamp.

The novel luminescent materials or phosphors are mixed sulfides of monovalent and trivalent host cations. The monovalent host cations are at least one of the alkali metals including sodium, potassium, rubidium, and cesium. The trivalent host cations are at least one of gadolinium, lanthanum, lutetium, scandium and yttrium. The phosphors contain 0.00005 to 0.05 mole per mole of phosphor of activating cations, which may be one or more of trivalent arsenic, bismuth, cerium, dysprosium, erbium, praseodymium, antimony, samarium, terbium and thulium; divalent europium, manganese, lead, and tin; and monovalent silver, copper and thallium. The novel phosphors have a rhombohedral crystal structure similar to that of alpha sodium ferric oxide and the empirical or molecular formula $$(\alpha \, Ma \, \gamma \, Mc \, \delta/2 \, Md) \, (\beta \, Mb \, \delta/2 \, Md \, \epsilon \, Me)S_2$$

where:
- Ma is at least one of monovalent Na, K, Rb and Cs,
- Mb is at least one of trivalent Gd, La, Lu, Sc and Y,
- Mc is at least one of the above-mentioned activating monovalent cations,
- Md is at least one of the above-mentioned activating divalent cations,
- Me is at least one of the above-mentioned activating trivalent cations,
- S is sulfur,
- $\alpha$ is 1.00 minus $\gamma$ minus $\delta/2$ mol,
- $\beta$ is 1.00 minus $\epsilon$ minus $\delta/2$ mol,
- $\gamma$, $\delta$ and $\epsilon$ are each in the range of 0.0 to 0.05 mol, and
- $\gamma$ plus $\delta$ plus $\epsilon$ is in the range of 0.00005 to 0.05 mol.

The preferred groups of the novel phosphors are $KYS_2$ and $NaYS_2$ host crystals, each activated with one of $Ag^{1+}$, $Cu^{1+}$, $Eu^{2+}$, $Ce^{3+}$, and $Bi^{3+}$.

BRIEF DESCRIPTION OF THE DRAWING

The sole FIGURE is a graph showing the normalized cathodoluminescent emission spectrum from several of the novel phosphors.

DETAILED DESCRIPTION OF THE EMBODIMENTS

The novel phosphors consist essentially of a host material having a rhombohedral crystal structure and the empirical formula $MaMbS_2$, where Ma and Mb are defined above. The Ma and/or Mb host cations are substituted for with the Mc, Md and Me activating cations described above to the extent of 0.005 to 5.0 mole percent, so that the resultant composition is electronically neutral. In order to simplify the notation, the compositions of the novel phosphors are designated by first indicating the host material and then indicating the mol concentration and the identity of the activating cations. It will be understood, however, that the activating cations actually substitute for host cations.

Crystallographic studies of $MaMbS_2$ compounds without activating cations revealed that the materials are related to the NaCl structure. The members of this family belong to the $\alpha NaFeO_2$ structure, which is related to the NaCl structure by elongating the body diagonal and ordering the metal ions on layers. Lithium may be present in the novel phosphors as up to about 5 to 10 mole percent of the Ma, so long as the $\alpha NaFeO_2$ structure is maintained.

By substituting Mc, Md and/or Me activating cations for a portion of the host cations up to 5 mole percent in these host materials, a family of new phosphors is provided which exhibits luminescence emission in the visible spectrum range. Photoluminescent and cathodoluminescent emissions have been observed from new phosphors activated with Cu, Ag, Mn, Sn, Sb, Pb, Bi, Ce, Pr, Sm, Eu, Tb, Dy, Ho, Er, and Tm. The novel phosphors disclosed herein all exhibit a crystal structure similar to that of $\alpha NaFeO_2$ (alpha sodium ferric oxide).

The trivalent ions Pr, Tb, Dy, Ho, Er, and Tm show sharp line emission at the frequencies characteristic for these ions. The ions $Ce^{3+}$ and $Eu^{2+}$ show band emission whose frequency is dependent on the particular host material. For example, $KYS_2:0.0001\ Ce^{3+}$ has a double-banded emission with one peak at about 4600A and the other at about 4900A, while $KGdS_2:0.001\ Ce^{3+}$ has a band emission with a peak at about 6200A. For $KYS_2:0.001\ Eu^{2+}$ band emission is obtained with a peak at about 5300A; and for $KGdS_2:0.001\ Eu^{2+}$, an emission band with a peak at about 5700A is obtained. Substituting sodium for potassium in the host material shifts the emission bands to longer wavelengths. Substituting rubidium for potassium shifts the emission bands to shorter wavelengths.

The novel luminescent materials can be produced by a variety of known methods. By one method, alkali metal carbonates are mixed with oxides of the other cations and then the mixture is heated at about 1000° to 1200°C in an atmosphere containing $H_2S$ or $CS_2$. By another method, a mixture of sulfates of the alkali metal and other cations is prepared and then the mixture is reduced with hydrogen or other reducing atmosphere. By another method, the respective sulfides are physically mixed, and then the mixture is fired under an inert atmosphere to produce the novel phosphors. By the preferred method, an excess of alkali-metal sulfides, thiocarbonates or amides is mixed with oxides and/or sulfides of the other cations, and the mixture is fired in an atmosphere containing hydrogen sulfide, carbon disulfide, sulfur vapor or other sulfurizing agent to produce the novel phosphors. Any residual alkali sulfide is washed out with water.

EXAMPLE 1

Dissolve 22.6 g of yttrium oxide $Y_2O_3$ in dilute nitric acid and add 2 ml of 0.1M europium nitrate solution. Adjust the pH of the solution to about 2 with $NH_4OH$, and then precipitate the Y and Eu values as mixed oxalates with an oxalic acid solution. Fire the mixed oxalates in air at about 750°C to produce a mixed oxide. Fire the mixed oxide contained in a carbon boat in a $CS_2$-containing atmosphere at about 1150°C to produce a mixed sulfide. The resulting mixed sulfide is then mixed with at least 18.6 g of $K_2CS_3$. An excess of $K_2CS_3$ can be used to give a fluxing action. Then, fire the mixture at about 1050°C for about 30 minutes in an inert or a sulfur-containing atmosphere. If an excess of $K_2CS_3$ is used, any residual $K_2S$ must be removed from the product by washing with $H_2O$. The resulting luminescent material, $KYS_2:0.001$ $Eu^{2+}$, is photoluminescent and cathodoluminescent with an emission peak at about 5350A. See spectral distribution curve 21 on the sole FIGURE.

EXAMPLE 2

Dissolve 22.6 g of $Y_2O_3$ in dilute nitric acid and add 2 ml of 0.1M cerium nitrate solution, adjust the pH of the solution to about 2, and precipitate mixed oxalates from the solution with an oxalic acid solution. Fire the resulting mixed oxalates in air at about 750° to produce a mixed oxide. Fire the mixed oxide in a $CS_2$-containing atmosphere, with the mixture contained in a carbon boat, at about 1150°C to produce a mixed sulfide. The resulting mixed sulfide is then mixed with 37.2 g of $K_2CS_3$ and fired at about 1050°C for 1 hour. At the end of the firing, the material is cooled and washed with water to remove any residual $K_2S$, producing $KYS_2:0.001$ $Ce^{3+}$ phosphor. The resulting phosphor is photoluminescent and cathodoluminescent and emits in bands at 4550A, 4900A, and 5900A. See spectral distribution curve 23 on the sole FIGURE.

EXAMPLE 3

Fire 22.6 g of $Y_2O_3$ in a $CS_2$ atmosphere at about 1150°C to produce $Y_2S_3$. This sulfide is slurried with an aqueous solution containing $2 \times 10^{-5}$ moles of bismuth. The slurry is dried at 120°C and then mixed with 37.2 g of $K_2CS_3$ and fired at about 1000°C for 1 hour in an inert atmosphere. After cooling, the material is washed with water to remove any residual $K_2S$, producing $KYS_2:0.001$ $Bi^{3+}$ phosphor. The resulting phosphor is photoluminescent, emitting in a band peaking at 4500A.

EXAMPLE 4

Fire 22.6 g of $Y_2O_3$ in $CS_2$ at 1150°C to produce $Y_2S_3$. This sulfide is then slurried with 2 ml of 0.1M copper nitrate solution and dried at 110°C. To this material, add 37.2 g of $K_2CS_3$ and fire the mixture at about 1050°C. in an inert atmosphere for about 45 minutes. After cooling, wash the material in water to remove residual $K_2S$. The resulting phosphor, $KYS_2:0.001$ $Cu^{1+}$, is photoluminescent and cathodoluminescent, emitting in a band whose peak wavelength is at about 5800A. See spectral distribution curve 25 on the sole FIGURE.

EXAMPLE 5

Dissolve 36.2 g of gadolinium oxide $Gd_2O_3$ in dilute nitric acid to which is added 2 ml of 0.1M europium nitrate solution, and adjust the pH of the solution to about 2 with $NH_4OH$. The mixed oxalates are then precipitated by adding thereto an oxalic acid solution, the precipitate is dried, and then fired at about 750°C in air to produce a mixed oxide. The mixed oxide is then converted to a mixed sulfide as in Example 1. The mixed sulfide is then mixed with 37.2 g of $K_2CS_3$ and fired at about 1050°C for about 45 minutes under a stagnant atmosphere of $H_2S$. After cooling, the product is washed with water to remove any residual $K_2S$. The resulting phosphor $KGdS_2:0.001$ $Eu^{2+}$ is photoluminescent and cathodoluminescent, emitting in a broad band whose peak is about 5700A.

EXAMPLE 6

Dissolve 33.3 g of lanthanum oxide $La_2O_3$ in dilute nitric acid, to which add 20 ml of 0.1M praseodymium chloride solution, and adjust the pH of the solution to about 2 with $NH_4OH$. Mixed oxalates are precipitated by adding oxalic acid to the solution. Then, dry and fire in air at about 750°C to form a mixed oxide. The mixed oxide is converted to a mixed sulfide by firing in a $H_2S$-containing atmosphere at 1150°C. To the mixed sulfide is added 37.2 g of $K_2CS_3$, and the mixture is fired at about 1050°C for about 45 minutes in an inert atmosphere. After cooling, the product is washed with water to remove any residual alkali sulfide. The resulting phosphor $KLaS_2:0.01Pr^{3+}$ is photoluminescent and cathodoluminescent, emitting in a group of lines in the region of 4900A to 5200A and in another group of lines in the region of 6500A to 6800A.

EXAMPLE 7

Dissolve 22.6 g of $Y_2O_3$ in dilute nitric acid to which is added 2 ml of 0.1M cerium acetate solution, and adjust the pH of the solution to about 2 with $NH_4OH$. Mixed oxalates are then precipitated by adding an oxalic acid solution thereto. The precipitate is dried and fired in air at about 750°C to produce a mixed oxide. The mixed oxide is then converted to a mixed sulfide by firing in a $CS_2$-containing atmosphere at about 1150°C. The mixed sulfide is then mixed with 16 g of $Na_2S$ and the mixture fired in an $H_2S$ atmosphere at 1050°C for 45 minutes. After cooling, the product is washed with water to remove any residual alkali sulfide. The phosphor $NaYS_2:0.001$ $Ce^{3+}$ obtained is photoluminescent and cathodoluminescent, emitting in two overlapping bands with peaks about 6100A and 6700A.

EXAMPLE 8

Dissolve 22.6 g of $Y_2O_3$ in nitric acid, add 2 ml of 0.01M europium sulfate solution, and adjust the pH of the solution to about 2 with $NH_4OH$. Mixed oxalates are then precipitated by adding an oxalic acid solution thereto. The precipitate is dried and fired in air at about 750°C to produce a mixed oxide. The mixed oxide is then converted to a mixed sulfide by firing in a $CS_2$-containing atmosphere at about 1150°C. The resulting mixed sulfide is then mixed with 8 grams of $NaNH_2$ and 10 grams of sulfur. This mixture is fired in a vertical tube so that sulfur is condensed on the cold upper end and runs back into the hot zone and revaporizes, i.e., the mixture is refluxed in sulfur vapor. The charge is held at about 1050°C for 45 minutes, and a stagnant atmosphere of hydrogen is added to the firing tube. After cooling, the resulting product is washed with water to remove any residual alkali sulfide. The phosphor $NaYS_2:0.001$ $Eu^{2+}$ obtained is photoluminescent and cathodoluminescent, emitting in a broad band whose peak is about 6800A.

EXAMPLE 9

Dissolve 36.2 g of $Gd_2O_3$ in dilute nitric acid, add 2 ml of a 0.1M ceric nitrate solution thereto, and adjust the pH of the solution to about 2 with $NH_4OH$. Mixed oxalates are then precipitated by adding an oxalic acid solution thereto, and the precipitate is dried and fired in air at about 800°C to produce a mixed oxide. The mixed oxide is then converted to a mixed sulfide by firing in an atmosphere containing $CS_2$ vapor at 1150°C. To the mixed sulfide is added 16 g of $Na_2S$, and the mixture is fired at about 1100°C for 30 minutes in an inert atmosphere. After cooling, any residual alkali sulfide is washed out with water. The phosphor $NaGdS_2$:0.001 $Ce^{3+}$ obtained is photoluminescent and cathodoluminescent emitting in a broad emission band with the principal peak at about 6500A.

The following chart tabulates some of the novel phosphors with preferred activator concentrations in mol percent and approximate dominant peak emission in A under cathode-ray and untraviolet excitation.

| Host | Activator | Mol Percent of Activator Concentration | Peak Emission |
|---|---|---|---|
| $KYS_2$ | $Eu^{2+}$ | 0.005 – 0.3 | 5350A |
| $KYS_2$ | $Ce^{3+}$ | 0.005 – 0.3 | 4550 |
| $KYS_2$ | $Cu^{1+}$ | 0.005 – 0.5 | 5800 |
| $KYS_2$ | $AG^{1+}$ | 0.005 – 0.5 | 5400 |
| $KYS_2$ | $Bi^{3+}$ | 0.005 – 0.3 | 4500 |
| $KYS_2$ | $Tb^{3+}$ | 0.005 – 5.0 | 5500 |
| $KGdS_2$ | $Eu^{2+}$ | 0.005 – 1.0 | 5670 |
| $KGdS_2$ | $Ce^{3+}$ | 0.005 – 0.5 | 4800 |
| $KGdS_2$ | $Tl^{1+}$ | 0.005 – 0.5 | 4400 |
| $KGdS_2$ | $Bi^{3+}$ | 0.005 – 0.3 | 4580 |
| $KLaS_2$ | $Ce^{3+}$ | 0.005 – 0.3 | 6100 |
| $KLaS_2$ | $Bi^{3+}$ | 0.005 – 0.3 | 4800 |
| $KScS_2$ | $Bi^{3+}$ | 0.005 – 0.3 | 4470 |
| $KScS_2$ | $Eu^{2+}$ | 0.005 – 0.5 | 5700 |
| $NaGdS_2$ | $Eu^{2+}$ | 0.005 – 1.0 | 7170 |
| $NaGdS_2$ | $Ce^{3+}$ | 0.005 – 1.0 | 6500 |
| $NaGdS_2$ | $Mn^{2+}$ | 0.005 – 5.0 | 6500 |
| $NaYS_2$ | $Eu^{2+}$ | 0.005 – 1.0 | 6700 |
| $NaYS_2$ | $Ce^{3+}$ | 0.005 – 1.0 | 6200 |
| $NaYS_2$ | $Tb^{3+}$ | 0.005 – 5.0 | 5500 |
| $NaYS_2$ | $Mn^{2+}$ | 0.005 – 5.0 | 6600 |
| $RbGdS_2$ | $Eu^{2+}$ | 0.005 – 0.5 | 5150 |
| $RbYS_2$ | $Eu^{2+}$ | 0.005 – 0.5 | 4980 |

We claim:

1. A luminescent material, having a crystal structure similar to that of alpha sodium ferric oxide and the empirical formula $$(\alpha\ Ma\ \gamma\ Mc\ \delta/2\ Md)\ (\beta\ Mb\ \delta/2\ Md\ \epsilon\ Me)\ S_2$$

wherein:

Ma is at least one monovalent cation selected from the group consisting of Na, K, Rb and Cs, Mb is at least one trivalent cation selected from the group consisting of Gd, La, Lu, Sc and Y, Mc is at least one monovalent cation selected from the group consisting of silver, copper and thallium, Md is at least one divalent cation selected from the group consisting of europium, manganese, lead and tin, Me is at least one trivalent cation selected from the group consisting of arsenic, bismuth, cerium, dysprosium, erbium, praseodymium, antimony, samarium, terbium and thulium, S is sulfur, $\alpha$ is 1.00 minus $\gamma$ minus $\delta/2$, $\beta$ is 1.00 minus $\epsilon$ minus $\delta/2$, $\gamma$, $\delta$ and $\epsilon$ are each in the range of 0.00 to 0.05 mol, and $\gamma$ plus $\delta$ plus $\epsilon$ is in the range of 0.00005 to 0.05 mol.

2. The material defined in claim 1 wherein said mixed host sulfide is potassium yttrium sulfide.

3. The material defined in claim 2 wherein said mixed host sulfide contains divalent europium activating cations.

4. The material defined in claim 2 wherein said mixed host sulfide contains trivalent cerium activating cations.

5. The material defined in claim 1 wherein said mixed host sulfide is sodium yttrium sulfide.

6. The material defined in claim 5 wherein said mixed host sulfide contains divalent europium activating cations.

7. The material defined in claim 5 wherein said mixed host sulfide contains trivalent bismuth activating cations.

* * * * *

UNITED STATES PATENT OFFICE
CERTIFICATE OF CORRECTION

PATENT NO. : 3,981,819

DATED : September 21, 1976

INVENTOR(S) : Perry Niel Yocom and John Pickett Dismukes

It is certified that error appears in the above-identified patent and that said Letters Patent are hereby corrected as shown below:

Column 4, line 42    change "0.01M" to --0.1M--

Signed and Sealed this

Twenty-eighth Day of December 1976

[SEAL]

Attest:

RUTH C. MASON
*Attesting Officer*

C. MARSHALL DANN
*Commissioner of Patents and Trademarks*